July 28, 1931.  O. D. JOHANTGEN  1,816,014
CALCULATING MACHINE
Filed April 27, 1925  9 Sheets-Sheet 1

Fig. 1.

Witness:
Geo. C. Davis

Inventor:
Oliver D. Johantgen
Jones, Addington, Ames & Seibold
Attys.

July 28, 1931.   O. D. JOHANTGEN   1,816,014
CALCULATING MACHINE
Filed April 27, 1925   9 Sheets-Sheet 3

Fig. 3.

Witness
Geo. C. Davison

Inventor
Oliver D. Johantgen
By Jones, Addington, Ames & Seibold
Attys

July 28, 1931.  O. D. JOHANTGEN  1,816,014
CALCULATING MACHINE
Filed April 27, 1925  9 Sheets-Sheet 7

Witness
Inventor
Oliver D. Johantgen
By Jones, Addington, Ames & Seibold
Attys

July 28, 1931.　　　　O. D. JOHANTGEN　　　　1,816,014
CALCULATING MACHINE
Filed April 27, 1925　　　9 Sheets-Sheet 8

Patented July 28, 1931

1,816,014

UNITED STATES PATENT OFFICE

OLIVER D. JOHANTGEN, OF CHICAGO, ILLINOIS, ASSIGNOR TO VICTOR ADDING MACHINE COMPANY, OF CHICAGO, ILLINOIS, A CORPORATION OF ILLINOIS

CALCULATING MACHINE

Application filed April 27, 1925. Serial No. 26,270.

My invention relates to calculating machines.

One of the objects of my invention is to provide improvements in an adding machine having two sets of accumulators.

A further object of my invention is to provide an adding machine of the two accumulator type which will be rugged and compact in construction and durable and efficient in use.

A further object of my invention is to provide improvements in the accumulator control construction.

A further object of my invention is to provide improvements in the signal type bar controlling mechanism.

A further object of my invention is to provide improvements in the flexible transmission between the main shaft and the flexible driven secondary shaft.

A further object of my invention is to provide improvements in the hammer mechanism.

A further object of my invention is to provide improvements in the platen carriage travel control mechanism.

A further object is to provide an improved friction drag for the actuating members.

Some of the features disclosed and claimed in this application are in the nature of improvements or developments of features shown in my Patent No. 1,336,840, dated April 13, 1920.

In the drawings, in which an embodiment of my invention is shown.

The adding machine shown comprises a series of actuating members or racks 1 reciprocable back and forth, a set of numeral keys 2 for each rack for limiting the distance which the respective racks move, two accumulators 3 and 4, one in front of the key-board, and the other in the rear of the key-board, carrying register wheels 5, the movement of which is controlled by the racks, and typing mechanism for listing and totalling the items set up.

Means are provided for controlling both accumulators for adding, non-adding, sub-totalling and totalling. A key lock mechanism is provided to prevent depression of any keys after the operator has started to actuate the main actuating handle. A repeat key is provided to be used when it is desired that the numbers set up shall be used in repeated operations. An error key is provided which is used to act on the key release mechanism to release the keys in case the wrong keys have accidentally been depressed.

In describing the machine the end of the machine at which the hammer mechanism is located will be referred to as the rear and the other end as the front of the machine.

*Accumulator controlling mechanism*

The accumulator mechanism is not claimed in this application, but forms the subject matter of my co-pending application, Serial No. 9327, filed February 14, 1925. So far as this application is concerned, it is only necessary to state that the register wheel pinions 6 are mounted in a frame 7 oscillatable about the studs 8 to move the pinions into and out of mesh with respect to the teeth of the reciprocable racks 1 at the proper time. The mechanism for controlling the oscillating movement of this frame comprises three principal reciprocable bars and associated mechanism. Two of these reciprocable bars are mounted on the right-hand side of the machine, the third being mounted on the left-hand side of the machine. The two bars 9 and 10 on the right-hand side of the machine control the movement of the accumulator pinions into mesh with their respective racks, while the bar 11 on the left-hand side of the machine controls the movement of the pinions away from the rack. The first reciprocable bar 9 cooperates with the add and non-add keys 12 and 13 of both accumulators while the second reciprocable bar 10 cooperates with the sub-total and total keys 14 and 15 of both accumulators. The first reciprocable bar 9 is normally in rearward position and is shifted forwardly at the beginning of the return or rearward stroke of the main actuating handle. The second reciprocable bar 10 is normally in rearward position but is shifted forwardly at the beginning of the forward movement of the operating handle.

These two bars are selectively placed in operative or non-operative relation with respect to the cams which control the movement of the accumulator by means of a plurality of dogs. Three of these dogs 16, 17 and 18 are coaxially pivoted at 19 on the cam 20 which controls the movement of the front accumulator and the other three 21, 22 and 23 are coaxially pivoted at 24 on the controlling cam 25 for the rear accumulator.

Depressing the non-add key 13 causes the pivoted dog 16 to be moved downwardly because of the engagement of the pin on the non-add key with the upper edge of this dog, and moves the lug or projection 26 of the dog 16 out of the way of the shoulder 27 on the reciprocable bar 9 so that movement of this bar will not then cause movement of the dog. The depression of the add key raises the non-add key through the rock lever 28 pivoted at 29 to the ends of which rock lever the lower ends of the add and non-add keys are connected respectively. The raising of the non-add key allows the spring 30 to raise the dog 16 which brings the lug 26 on this dog in front of the shoulder 27 on the reciprocable bar 9, so that when this bar is moved forward it will move the pivoted dog ahead of it and cause the accumulator shifting cam to be actuated. In a similar manner the add and non-add keys for the rear accumulator control the movement of the lug or projection 31 on the pivoted dog 21 into and out of engagement with respect to the shoulder 32 on the reciprocable bar 9. A spring 33 raises the dog 21 when the add key 12 is depressed.

The depression of the front sub-total key 14 moves the pivoted dog 17 down by means of the pin 34 on the key which engages a slot 35 in the dog. This downward movement of the dog moves the shoulder 36 on the dog in front of the pin 37 on the second reciprocable bar 10 so that when this bar is moved forward it will move the pivoted dog ahead of it and actuate the accumulator shifting cam. The return movement of the reciprocable bar, however, will not cause a movement of the accumulator shifting cam as the pin 37 will simply move away from the shoulder 36 on the dog. In a similar manner, the sub-total key 14 for the rear accumulator controls the engagement of the shoulder 38 on the pivoted dog 22 with the pin 39 on the reciprocable bar 10.

When the front total key 15 is depressed it connects the pivoted dog 18 with the reciprocable bar 10 so that the dog will move with the bar in both directions of its movement. This engagement is effected by means of a notch 40 on the pivoted dog 18 which receives the pin 37 on the reciprocable bar when the total key is depressed. The depression of the pivoted dog is effected by means of a pin 41 on a total key 15 which engages a slot 42 in the pivoted dog. In a similar manner the total key 15 for the rear accumulator controls the engagement of the notch 43 on the pivoted dog 22 with the pin 39 on the reciprocable bar. Springs 44 are provided for returning the total and tub-total keys for both accumulators, when released.

Figure 1:
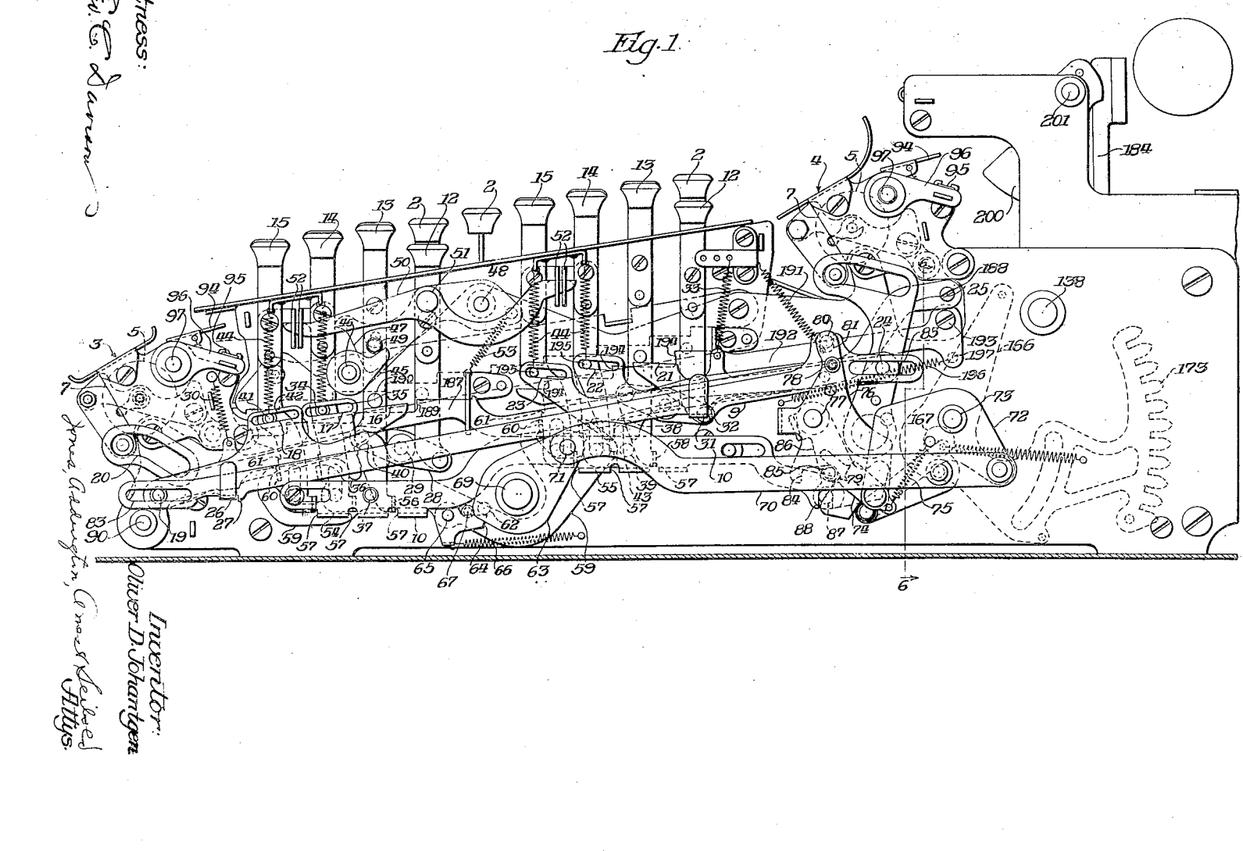
Figure 1 is a side elevational view showing two accumulators and "add", "non-add", "sub-total" and "total" keys for both accumulators.
Figure 3:
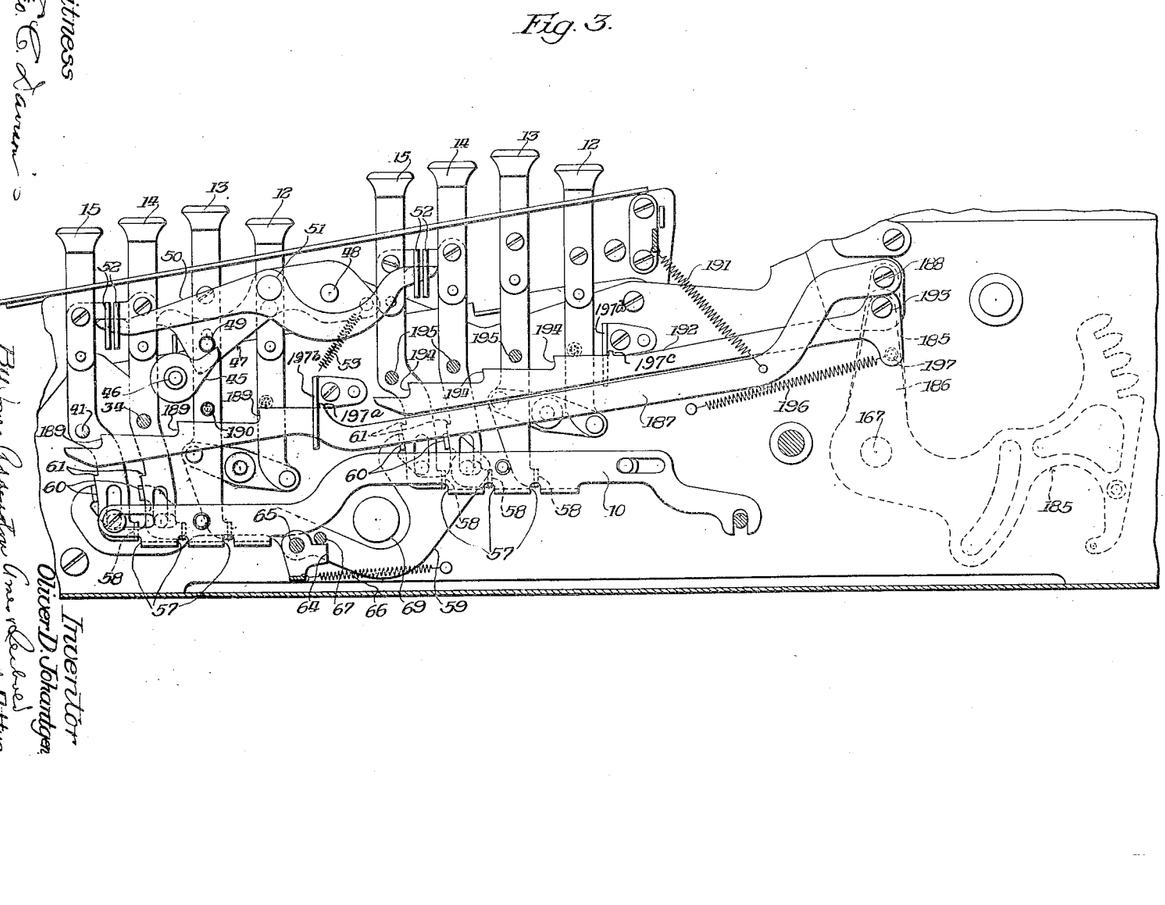
Fig. 3 is an enlarged view showing the non-add, add, sub-total and total keys for both accumulators and part of the mechanism controlled thereby.

Means are provided (Figs. 1 and 3) whereby the depression of the sub-total or total key for either accumulator will cause the release of all depressed numeral keys. The mechanism for the release of these depressed numeral keys is not disclosed in detail, but in general it will be understood that when the rock member 45, secured to the rock shaft 46, is depressed it will cause the release of any depressed number keys. Transmission is provided from all four of the total and sub-total keys, whereby the depression of any one of these keys will actuate the rock member 45 and effect the release of the numeral keys. This transmission comprises a rock member 47 pivotally mounted at 48 and having a pin 49 for engagement with the rock member 45 and an equalizer member 50 pivotally mounted on the rock member 47 at 51. The ends of this equalizer member 50 extend underneath lugs 52 mounted on the total and sub-total keys, respectively. With this construction it will be seen that the depression of any one of the four total or sub-total keys will cause a depression of one end of the equalizer lever and the consequent depression of the rock members 47 and 45 and the release of the numeral keys. A spring 53 is provided which tends to hold the rock member and the equalizer carried thereby in raised position.

The second reciprocable bar is provided with notched flanges 54 and 55 which cooperate with the lugs 56 on the non-add, total and sub-total keys to prevent the depression of any of these keys when the bar is moved from its normal position, and to hold depressed any one of these keys which may have been depressed prior to the movement of the bar from its normal position. In the normal position of the bar the notches 57 are in alinement with the lugs 58 on the keys and do not interfere with the movement of the keys, but when the bar is moved from normal position, the notches are out of alinement with the lugs and prevent movement of the keys.

In order to hold the spring controlled total and sub-total keys down, when depressed, a slidable latch plate 59 is provided with latching projections 60 for cooperation with latch shoulders 61 on the respective keys. This latch plate is released at the end of the return movement of the actuating handle by means of a pin 62 on the rock member 63 which engages a dog 64 pivoted on this latching slide 59 at 65. A spring 66 is provided which tends to hold the end of this dog in raised position with the upper part of the dog engaging the stop pin 67. On the forward movement of the handle the pin 62 on the rock plate simply moves the dog down and out of its way, but on the final return movement of the handle and rock plate, the pin 62 engages the end of the dog 64 and forces the latching slide 59 to the left, as viewed in Figs. 1 and 3, to release any total or sub-total key which may have been depressed.

The first reciprocable bar 9 is operated at the proper time at the beginning of the return movement of the operating handle by transmission from the rock plate 63 mounted on the main operating shaft 69, which transmission comprises a link 70 pivoted to this oscillatable rock plate at 71, a rock plate 72 pivotally mounted at 73 and pivotally connected to the end of the link 70, a double acting dog 74 oscillatably mounted on the rock plate 72 and acted on by a tension spring 75, which tends to hold it in mid-position and a rock plate 76 pivotally mounted at 77 and having a pin 78 engageable with the upper one of the two shoulders 79 on the double acting pawl 74 and also having a pin 80 working in a notch 81 on the reciprocable bar 9.

This bar is reciprocably mounted on the pins 19 and 24 mounted on the accumulator shifting cams, which pins engage slots 83 in the ends of the bar 9, whereby a lost motion connection is provided so that the cams can be moved independently of the reciprocable bar when necessary, as when they are being controlled by the second reciprocable bar 10. The second reciprocable bar 10 is controlled in its reciprocating movement by means of the double acting pawl 74, previously referred to, and by a projection 84 on the rock plate 76 previously referred to. The double acting pawl controls this second reciprocable bar 10 for forward movement by engaging a pin 85 mounted on the rock member 86, which rock member is provided with a second pin 87 engaging a notch 88 in the reciprocable bar. The rock member controls this reciprocable bar for rearward movement by means of the projection 84 which also engages the pin 85 on the rock member 86, referred to. The double acting pawl 74 shifts the bar 10 forward at the beginning of the forward stroke of the main actuating handle and the rock plate 76 causes rearward movement of the reciprocable bar 10 at the beginning of the return movement of the actuating handle, that is, when the double acting pawl 74 engages the pin 78 on the rock member 76.

With this construction it follows that when either add key is depressed the accumulator pinions will be out of mesh on the forward stroke of the operating handle and will be in mesh on the rearward stroke. With the sub-total key depressed the pinions will be moved into mesh with the racks at the beginning of the forward movement of the handle and will remain in mesh throughout both the forward and return stroke of the handle. When the total key is depressed, the corresponding accumulator will be moved into mesh with the racks at the beginning of the forward stroke of the handle and will be moved out of mesh at the beginning of the return stroke.

Figure 4:
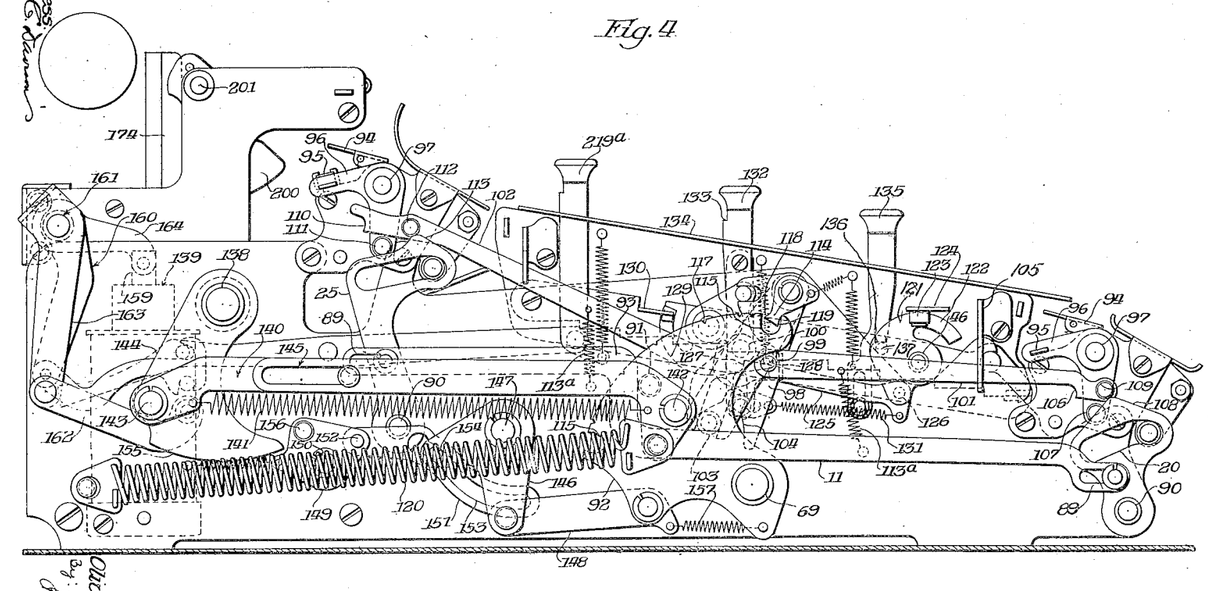
Fig. 4 is a view of the left-hand side of the machine showing the two accumulators, the non-print, repeat, and error keys and part of the mechanism controlled thereby, the key lock mechanism, the control for the carry dog return bars and the flexible link transmission between the main actuating shaft and the rack controlling mechanism.

The third reciprocable bar 11, previously referred to for controlling the movement of the accumulator pinions away from their racks, is mounted on the left-hand side of the machine and has a pin and slot engagement 89 at each end, respectively, with the accumulator controlling cams 20 and 25. It will be understood that each accumulator has one of these controlling cams at each end, the cams being mounted on rock shafts 90 which extend from one side to the other in the machine, so that the two cams for the same accumulator move together. This third reciprocable bar 11 is controlled by means of a pin 91 on a rock plate 92 mounted on the main rock shaft 69, which pin 91 engages an offset portion or shoulder 93 on the reciprocable bar 11 to move it to the left as shown in Fig. 4 at the end of the return stroke of the handle. This will move the reciprocable bar to its extreme left-hand position and will return either accumulator to raised position if it is depressed at that time.

Carry dog returning mechanism

It is necessary that the carry dogs 94 should be returned or reset at the proper time and for this purpose a universal returning or setting bar 95 is provided for each set of carry dogs, the ends of this bar being mounted on bell crank levers 96 pivotally mounted at 97. For controlling the movement of these setting bars, a rock member 98 is provided to which are pivotally secured at 99 and 100, a pair of dogs 101 and 102 for cooperating with the bell crank levers 96, respectively. The rock member 98 is actuated by means of a pin 103 on the rock plate 92 which cooperates with a wide-mouthed notch or slot 104 in the rock plate 98. The flaring mouth of this notch 104 permits a certain necessary lost motion at both ends of the movement of the rock plate 98 with respect to the rock plate 92.

The pivoted dog 101 is guided in a notch in the guide plate 105 and is provided with a hook portion 106 in cooperation with a pin 107 on the forward bell crank 96. This pivoted dog 101 is controlled in its movement by means of the upper edge 108 of the accumulator controlling cam 20 which cooperates with a pin 109 on the pivoted dog 101. At the proper time in its movement, the accumulator controlling cam 20 permits the pivoted dog 101 to drop so that the hook 106 on this dog will engage the pin 107 on the bell crank lever so that rearward movement of the dog 101 will cause the bell crank lever to be oscillated to raise the universal setting bar 95 and reset the carry dogs 94 of the front accumulator.

In a similar manner the other pivoted dog is provided with a notch or shoulder 110 (corresponding to the hook portion 106 of the dog 101) which cooperates with a pin 111 on the bell-crank lever 96 for the rear accumulator and is provided with a pin 112 which cooperates with the upper edge 113 of the accumulator cam. Springs 113a are provided which hold the dogs 101 and 102 down in proper working position.

Non-retrograde mechanism

In order to prevent retrograde movement of the rock plate 92, a double-acting pawl 114 (Figs. 4 and 5) is provided which cooperates with two main notches 115 at the ends of the curved portion 116 of this rock plate and which also cooperates with intermediate notches 117 between the two main notches. When the upper edge of this rock plate is moved to the right, as seen in Fig. 4, the lower end of the double acting pawl 114 will swing to the right and the curved edge of the rock plate will ride along underneath the point 118 of this double acting pawl. After one of the intermediate notches 117 passes the point of this pawl the rock plate cannot thereafter be given any material retrograde movement until the rock plate has been given its full movement as the point 118 of the dog would drop into one of the intermediate notches and hold it against any material retrograde movement. However, when the rock plate has completed its movement in one direction, the main notch 115 comes underneath this pawl and this notch is of sufficient size to permit the pawl to reverse itself so that on the return movement of the rock plate the other point 119 of the pawl will ride upon the notched curved edge of the rock plate.

A powerful spring 120 is provided to return the rock plate 92 after it has been moved forward by the operating handle.

Repeat, error, key release and key lock mechanism

The release mechanism for the numeral keys hereinbefore referred to as controlled by the sub-total and total keys, comprises a cam member 121 (Fig. 4) mounted on the rock shaft 46 having a spiral portion 122 which engages a roller 123 on a transversely reciprocable bar 124 which, when operated, releases any depressed numeral keys.

This release cam is also automatically actuated at the end of the return stroke of the main operating handle to release all depressed numeral keys unless the repeat key is depressed. This automatic operation is effected by means of a dog 125 pivotally mounted at 126 on the cam member and having a shoulder portion 127 engageable and disengageable with respect to a pin 128 on the oscillatable cam member 129 which controls the numeral key lock bar 130. A coil tension spring 131 tends to hold this pivoted dog in cooperative relation with respect to the pin on the cam. During the forward movement of the operating handle the pin 128 on the cam moves to a position in the rear of the shoulder 127 on the dog 125 and toward the latter portion of the return stroke of the handle this pin 128 engages the shoulder 127 and rocks the cam 121 to operate the key release bar 124. At the final movement of the operating handle the shoulder 127 of the dog is automatically released from the pin 128 on the cam, and the spring 131 acts to return the cam 121 to its initial position.

If it is desired that the depressed numeral keys should not be released at the end of the return stroke of the handle, the repeat key 132 is depressed and pushed forward so that its shoulder 133 lies underneath the keyboard 134 to hold it in depressed position. This pushes the pivoted dog 125 down so that the shoulder 127 is out of the path of movement of the pin 128 on the cam 129 and hence this dog 125 will not be actuated and the numeral key release bar 124 will not be operated.

The error key 135 is also associated with this key release bar 124 so that, when desired, any keys which were inadvertently or incorrectly depressed can be released simply by pressing down on this error key. This error key has a shoulder portion 136 which engages the pin 137 on the cam member 121 to actuate it to cause the operation of the key release bar 124, and the consequent release of any depressed numeral keys.

*Toggle lock for positively driven main shaft controlled by flexible driven secondary shaft*

A secondary rock shaft 138 is provided for controlling the reciprocating movement of the racks 1 and the movement of the type bars and hammer mechanism. A flexible transmission is provided between the main rock shaft 69 and this secondary rock shaft 138 which enables the secondary rock shaft 138 to lag behind the main rock shaft if the handle is actuated too fast for the secondary shaft to keep up with it. A dash pot mechanism 139 is provided for controlling the speed of movement of the secondary shaft. This flexible transmission (Figs. 4 and 5) between the main shaft and secondary shaft comprises a two-part extensible link 140 and a coil tension spring 141 connecting the two parts of the link. One part of the link is pivotally connected at 142 to the rock plate 92 and the other part of the link is pivotally connected at 143 to the rock plate 144 secured to the secondary shaft 138. The two parts of the extensible link have a pin and slot engagement with each other at 145 which permits the necessary elongation of the link.

In order to insure full movement of the secondary rock shaft, a toggle lock is provided for the main rock shaft 69, which toggle lock cannot be released until the secondary shaft 138 has completed its full movement. This toggle lock mechanism comprises a rock member 146 pivotally mounted at 147 and a link 148 pivotally connected at one end of this rock member and at its other end pivotally connected to the rock plate 92 on the main rock shaft.

The breaking of this toggle is controlled by a rock plate 149 pivotally mounted at 150 and a slotted link 151 pivotally connected at 152 to this rock plate 149 and having a curved slot 153 to receive a pin 154 on the rock member 146 of the toggle lock. This rock plate 149 is itself controlled by the engagement of the curved cam portion 155 of the rock plate 144 on the secondary shaft with a pin 156 on the rock plate 149.

Figure 5:
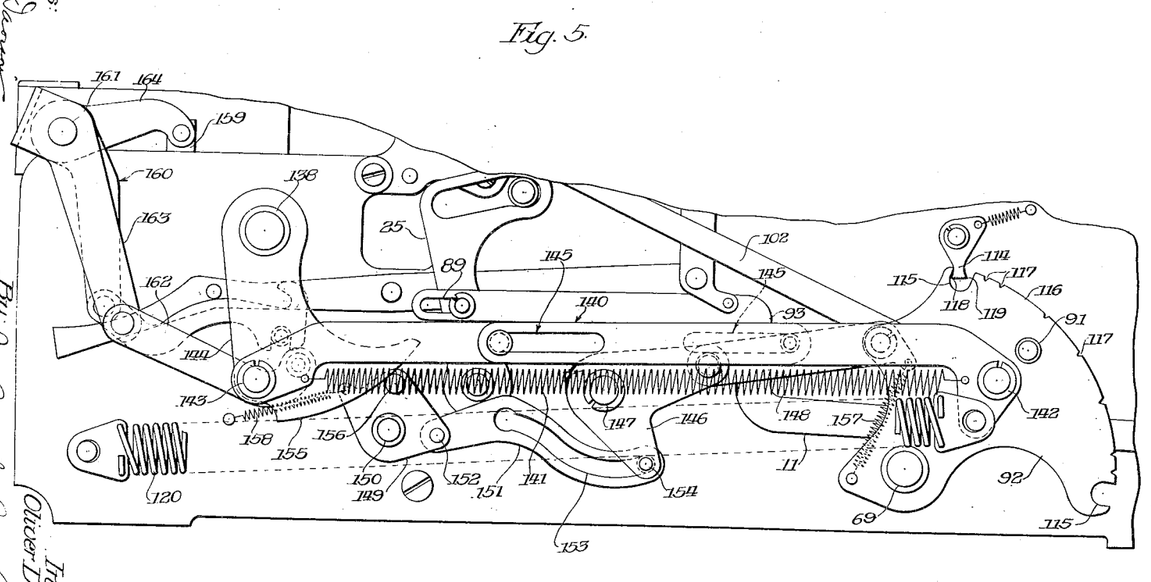
Fig. 5 is an enlarged view showing this flexible link and the toggle lock for preventing return movement of the main shaft before the flexibly driven mechanism has completed its movement.

If the handle is operated so fast that the secondary shaft cannot keep up with it, it permits the spring 157 to throw the toggle mechanism into lock position, as shown in Fig. 5, which will prevent the return stroke of the handle until the curved cam portion 155 of the rock member has moved out of engagement with the pin 156 on the rock plate 149, whereupon the tension spring 158 acts on this rock plate to oscillate it about its pivot and to pull the slotted link to the left, as viewed in Figs. 4 and 5 to oscillate the rock plate 146 of the toggle and break the toggle, whereupon the return stroke of the handle may be made.

*Dash pot mechanism*

The dash pot plunger 159 is connected with the secondary rock shaft 138 by means of a bell-crank lever 160 having its arms secured to the rock shaft 161 and a link 162 pivotally connected to one arm 163 of the bell-crank lever. The other arm 164 of the bell-crank lever is pivotally connected to the dash pot plunger 159 and the other end of the link 162 is connected to the rock plate 144 of the secondary rock shaft.

*Rack controlling mechanism*

Figure 2:
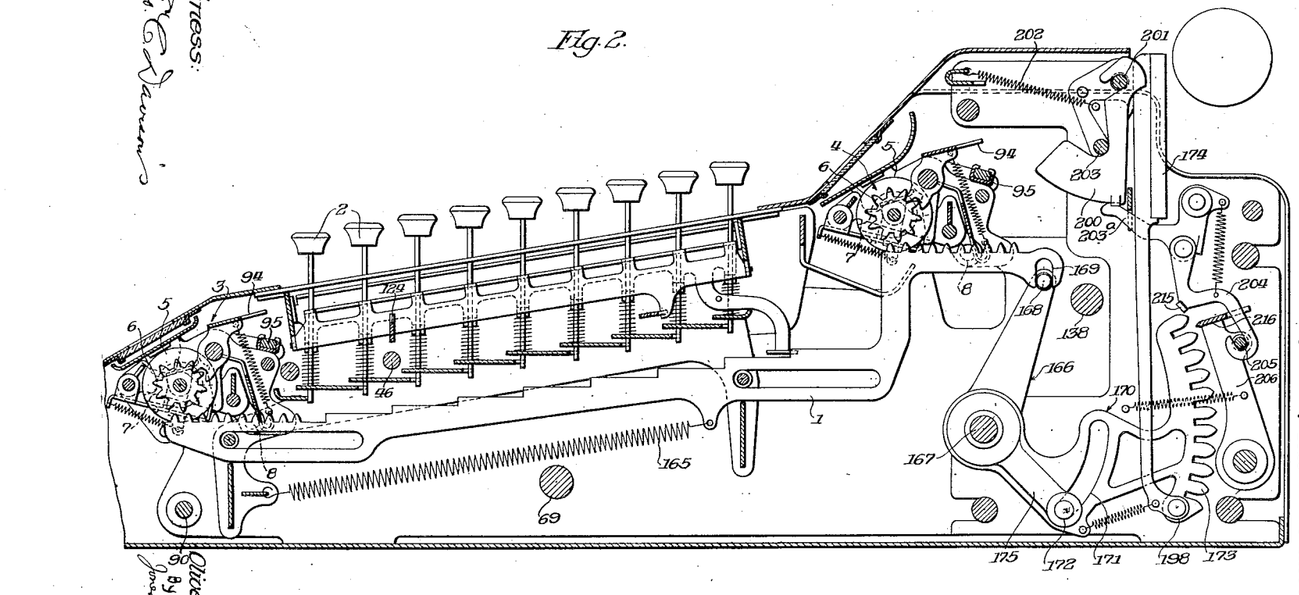
Fig. 2 is a vertical sectional view showing the racks, keys, accumulators, rack controlling mechanism and hammer mechanism.
Figure 6:
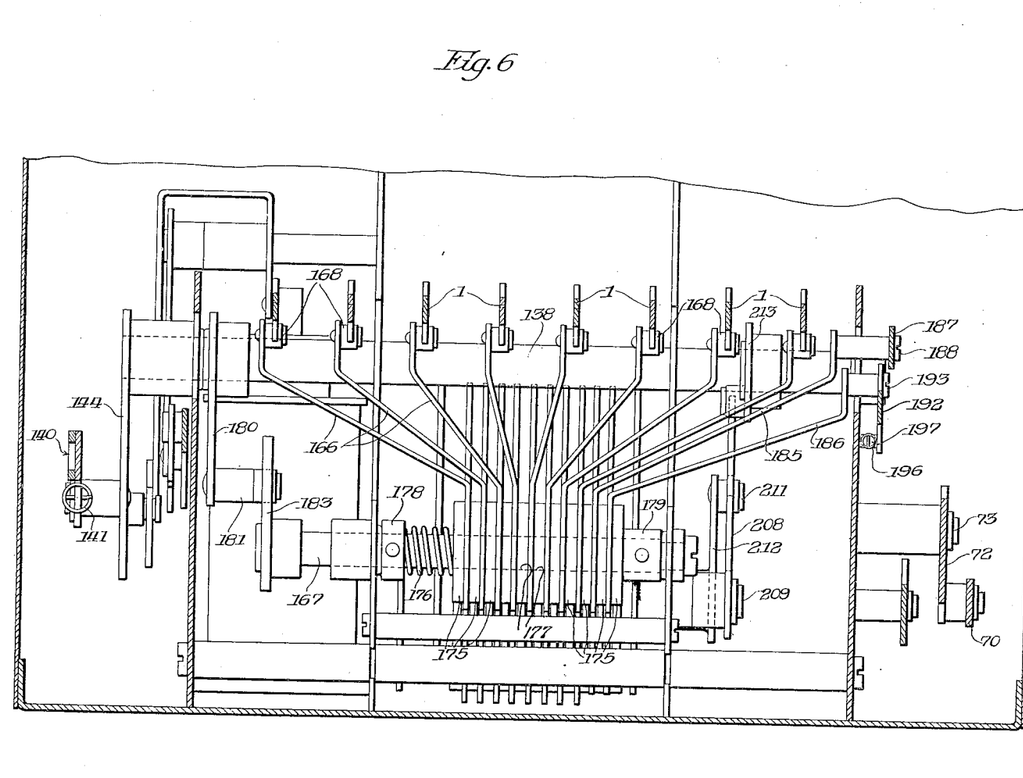
Fig. 6 is a transverse vertical section on the line 6—6 of Fig. 1, showing the friction drag rack controlling mechanism and associated parts.
Figure 7:
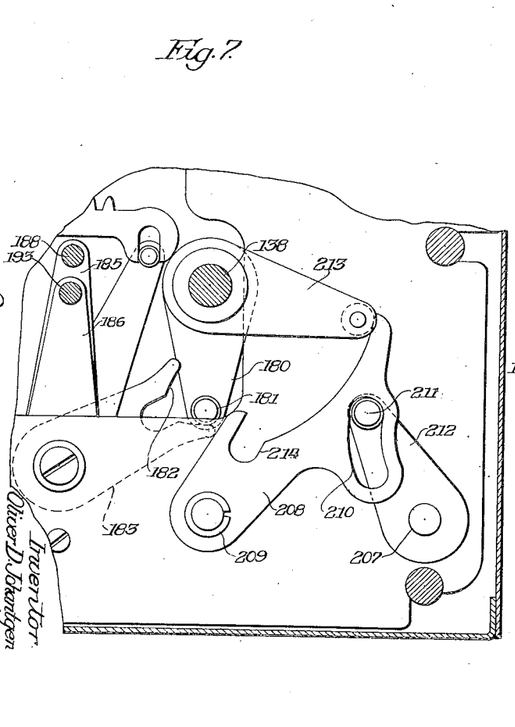
Fig. 7 is a detail view showing the drive for the friction drag transmission and for the hammer release mechanism.

The racks 1 controlled by the numeral keys 2 are acted on by coil tension springs 165 (Fig. 2) which tend to pull them forward and are controlled when released for forward movement by means of individual rock levers 166 oscillatably mounted on the transversely extending shaft 167. Each of these rock levers 166 has a pin 168 which works in a slot 169 on the rear end of the rack 1 and each lever 166 is provided with a rearward extension 170 having an arcuate slot 171 for cooperation with the universal swinging controlling bar 172 and having also a segmental toothed portion 173 forming part of the correcting or rectifying mechanism for the type bars 174. These rock levers are frictionally controlled in their movement by means of individual friction levers 175 which swing with the universal bar 172 and are arranged alternately with respect to the rack controlling rock levers, the entire series of alternating rock levers and friction levers being pressed together by means of a coil tension spring 176 on the rock shaft 167. The universal bar 172 which extends through the eyes 177 in the friction levers 175 and through the slots 171 in the rack controlling levers 166 is mounted on and extends between a pair of rock arms 178 and 179 secured to the rock shaft 167. This rock shaft 167 is oscillated back and forth from the secondary flexibly driven rock shaft 138 by means of a rock arm 180 (Figs. 6 and 7) mounted on this secondary shaft and having a pin 181 which engages a flaring mouthed slot 182 in the rock arm 183 secured to the rock shaft 167. This flaring entrance to the slot 182 in the rock arm permits a slight lost motion between the driving rock arm 180 and driven rock arm 183, both at the beginning and end of the oscillatory movement of the driving rock arm, which lost motion is necessary to permit certain preliminary operations to be performed before the movement of the rock arm should begin.

With this construction of friction levers 175 and rock levers 170 it will be seen that any rock levers, which are not allowed to move, act as a friction drag to the friction levers, which are all compelled to move when the operating handle is moved, so that each rock lever offers a certain resistance to movement of the handle, even though it is not operated.

Signal type bar control

There are two of these signal type bars 184, each with its own rock lever 185 and 186 and controlling mechanism, one signal type bar being controlled by the non-add, total and sub-total keys of the front accumulator and the other being controlled by the corresponding keys of the rear accumulator. The control from the front accumulator is effected by means of an elongated dog 187 (Figs. 3 and 6) pivotally mounted on the rock lever 185 at 188 and having three shoulders 189 for cooperation with pins 41, 34 and 190 on the front control keys. Whichever one of these three keys is depressed determines the distance to which the elongated dog 187 will move, as the depression of the key brings the pin on that key into the path of movement of the corresponding shoulder 189 on the pivoted dog. The dog is held in raised position by means of a coil tension spring 191.

In a similar manner the movement of the rock lever 186 for the other signal type bar is controlled in its movement by means of an elongated dog 192 pivotally mounted at 193 on the rock lever 186 and provided with shoulders 194 for cooperation with laterally extending pins 195 on the control keys and for the rear accumulator. This dog is held in raised position by means of a coil tension spring 196 secured to a downward extension on the pivoted dog at 197.

The dog or slide 187 is normally held against movement by means of a lug or shoulders 197a formed integral therewith which engages a fixed detent 197b. When, however, any one of the keys 12, 13, 14 or 15 is depressed, the shoulder 197a is moved downwardly out of engagement with the detent 197b whereupon the dog is moved forward under the action of spring 196 until it is stopped in a position determined by that one of the aforementioned keys which is depressed.

Similarly, the dog or slide member 192 is normally held against movement by means of the lug or shoulder 197c which engages a fixed abutment 197d. However, when one of the control keys 12, 13, 14 or 15 is depressed the dog 192 will also be depressed to release it from engagement with the detent 197b whereupon the dog moves forward under the action of the spring 196 until stopped in a position determined by that one of the keys 12, 13, 14 or 15 which is depressed.

Type bar and hammer mechanism

The numeral type bars 174, as well as the signal type bars 184, are pivotally mounted on the rock levers 170 and 185, respectively, as indicated at 198 and 199 and are raised to different heights for printing depending on which controlling key is depressed. The hammer mechanism for each numeral type bar, shown in Fig. 2, comprises a hammer 200 oscillatably mounted on a pivot shaft 201 and actuated by a tension spring 202, a universal bar 203 for permitting the hammers to act under the action of the spring 202 when released by the detent 203a and for returning the hammers after they have actuated the type bars, a trip member 204 for moving the detent 203a to release the hammer and a universal bar 205 for actuating the trip members. This universal bar 205 is mounted on and extends between a pair of rock arms 206 mounted on a rock shaft 207. This rock shaft 207 is oscillated at the proper time by means of a rock plate 208 (Figs. 6 and 7) pivotally mounted at 209 and having a cam slot 210 which receives a pin or roller 211 on a rock arm 212 secured to the rock shaft 207. This rock plate 208 is actuated by means of a rock arm 213 on the secondary rock shaft 138 which engages a notch 214 in the rock plate 208 at the end of the forward movement of the actuating handle causing the movement of the rock shaft 207 required to trip the selected type hammers.

The operation of the trip member is effected by engagement of the nose portion 215 of the trip member with one of the teeth 173 on the rock lever 170. If the rock lever 170 has not been moved, the nose 215 on the trip member simply passes above the upper tooth and the detent 203 is not released.

In order to rectify or justify any slight misalignment of the rock levers which carry the type bars, a universal adjusting bar 216 is mounted on the rock arms 206, which bar cooperates with the notches between the teeth 173 of the rock levers to bring the type bars into accurate alinement for printing.

Figure 8:
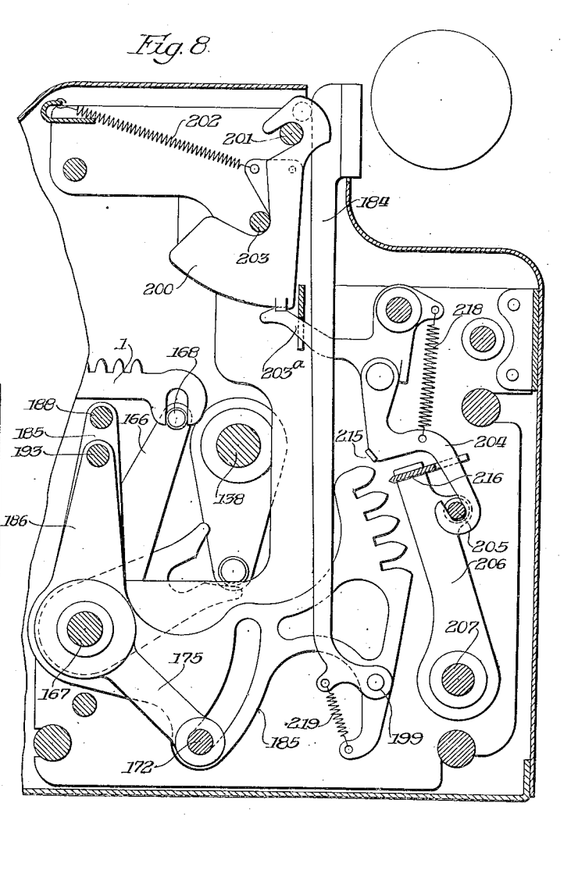
Fig. 8 is a detail view showing the control for the signal type bar and its associated hammer mechanism.

The hammer mechanism for controlling the signal type bar, shown in Fig. 8, corresponds in all respects to that just described in connection with the numeral type bars. The universal hammer controlling bar 203 is operated at the proper time to permit the actuation of the selected hammers and to return such hammers as have been released at the proper time. For holding the detent 203 and type bar 184 in operative position, springs 218 and 219, respectively, are provided. If, at any time, it is desired that the hammer should not be actuated for printing, the non-print key 219a (Fig. 4) is depressed which prevents the movement of the hammer controlling bar 203 from moving from the position shown in Fig. 8, by suitable transmission not described in detail.

Carriage stop mechanism

I have provided a carriage stop mechanism which will prevent any possibility of the carriage being run past the carriage stop. With the ordinary spring latch and notch carriage stop, if the carriage is given a quick movement, it is liable to be traveling so fast that the latch will not have time to enter the notch properly and will bounce out again and the carriage will move past the desired position. My improved carriage stop not only positively prevents overthrow of the carriage but also very accurately positions the carriage.

This is accomplished by means of a pair of stop dogs 220 oscillatable in a horizontal plane about their fixed pivot pins 221 and provided with a spring 222 connecting them which tends to hold the points of the dogs in rearwardly projecting position. The carriage is provided with a transversely extending bar 223 oscillatable by means of a thumb lever 224 and provided with any desired number of adjustable stop members 225. A tension spring 226 is provided connected to a pin 227 on the thumb lever 224 and acting on the oscillatable stock carrying bar 223 tending to hold the stop toward the pivoted stop dogs 220. The carriage is provided with any suitable type of platen 227a and platen controlling mechanism 228 and is slidably mounted in fixed guides 229 by means of a transversely extending rod 230 slidable in these guides.

Each stop member 225 comprises a strap shaped to provide a loop portion 231 to receive the rod 223 and having two downward extensions 232 and 233 to receive a screw 234 on which a clamping nut 235 is threaded. The stop member may be set in any desired position on the rod by tightening up the clamping screw 235. The front downward extension 232 is provided with a stop projection 236 for cooperating with the two pivoted stop dogs 220.

Figures 9, 10, 11, 12:
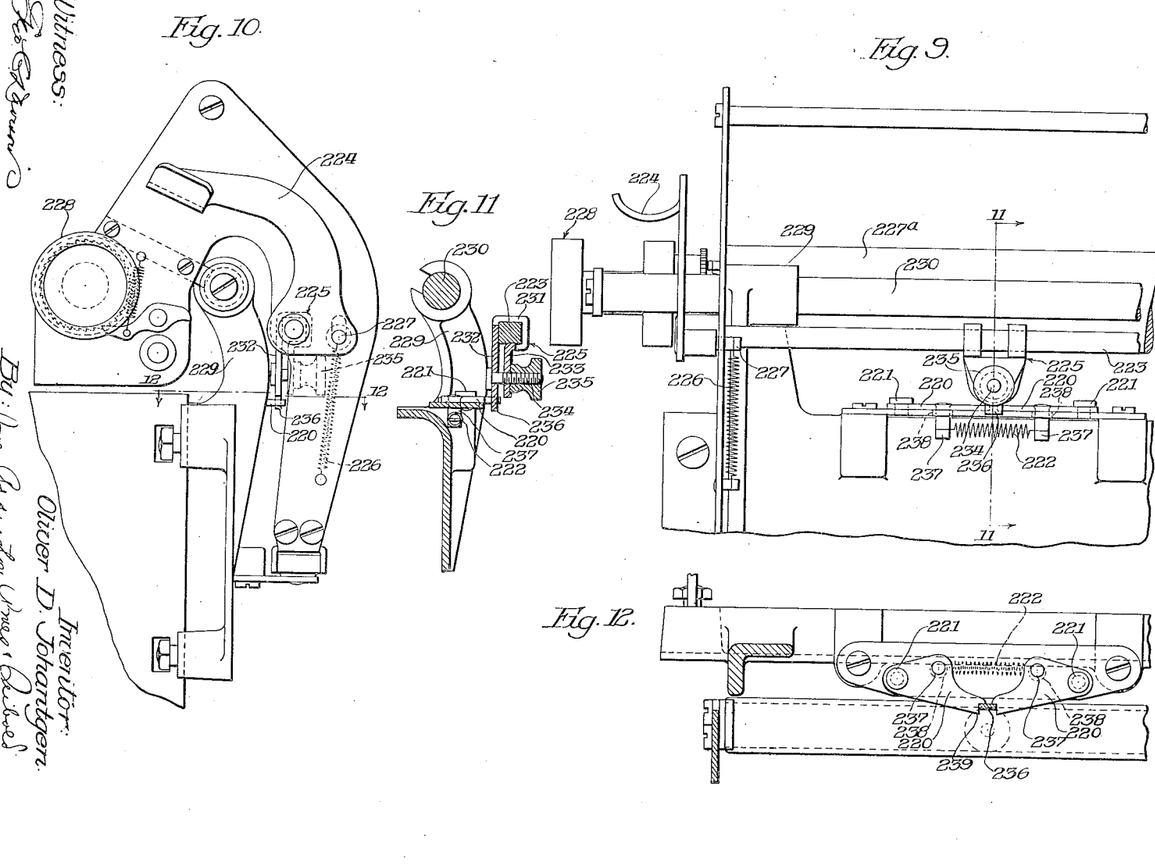
Fig. 9 is a detail rear elevational view showing the carriage stop.
Fig. 10 is a right-hand side view of the parts shown in Fig. 9.
Fig. 11 is a section on the line 11—11 of Fig. 9.
Fig. 12 is a section on the line 12—12 of Fig. 10.
Figures 13, 14, 15:
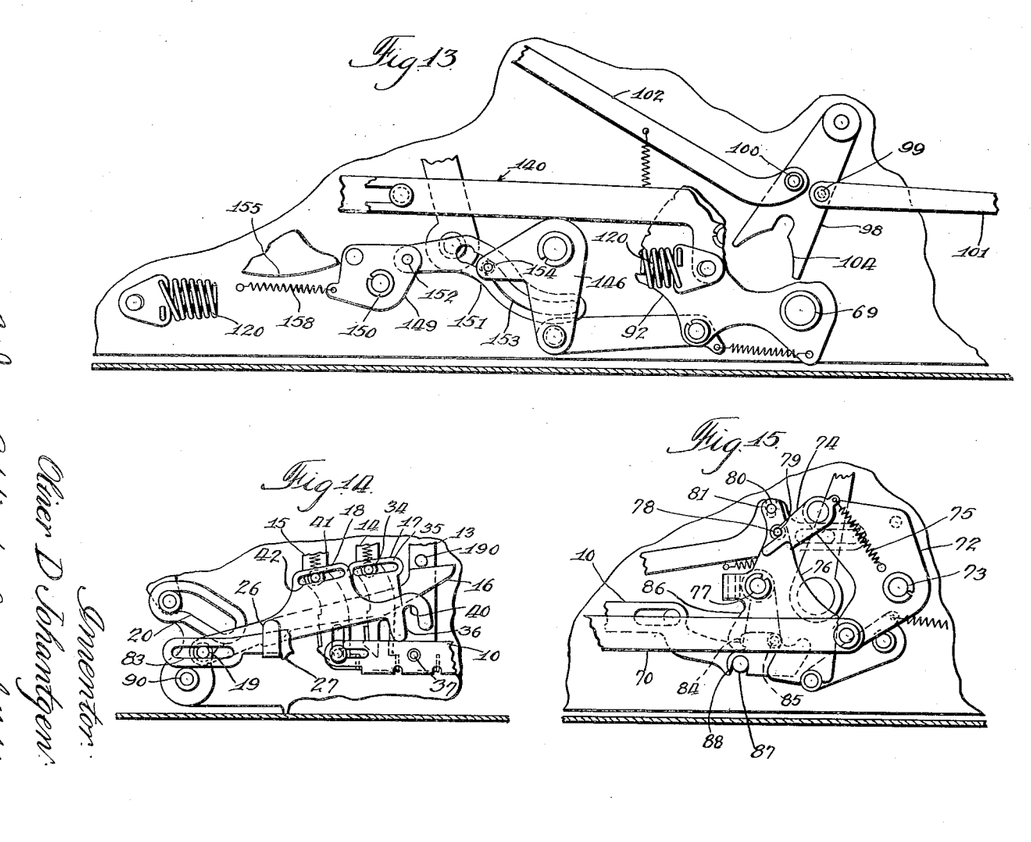
Fig. 13 is a side elevation of part of the left-hand side of the machine with portions broken away to show the toggle link mechanism in a different position from that shown in Fig. 5 and to show the control for re-setting the carry dogs.
Fig. 14 is a detailed view showing the dogs which control the front accumulator shift.
Fig. 15 is a detailed view showing the transmission for one of the control bars in a different position from that shown in Fig. 1.

Figs. 9 and 12 show the stop mechanism in latched position holding the stop projection 236 snugly between the opposing faces of the two dogs 220. In operation, assuming first that the carriage is in latched position, as shown in Figs. 9 and 12, the operator presses down on the thumb lever 224 to rock the stop carrying shaft 223 to swing the stop projection 236 away from the pivoted stop dogs 220. As the stop projection 236 swings rearwardly, the pivoted stop dogs follow it up until their movement is arrested by the downwardly extending pins 237 on the stop dogs which operate in holes 238 in the supporting plate which are slightly larger in diameter than the pins 237 to permit a limited movement of the stop dogs. The ends of the spring 222 are secured to these pins 237. This rearward movement of the stop projection 236 is sufficient to move the projection completely clear of both stop dogs 220, thus releasing the carriage for sliding movement. It will be noted that on this rearward movement of the pivoted dogs, the opposing shoulders of the dogs move away from each other slightly so that the space between these two shoulders is then slightly greater than the width of the stop projection on the stop member.

Assuming now that the carriage has been released from these stop dogs and is to be shifted laterally and is to be stopped and accurately positioned by the pivoted stop dogs, in this part of the operation the thumb lever 224 is not depressed by the operator, the carriage being simply shifted laterally and the downward projection on the stop member riding on the slanting edge of one of the stop dogs and forcing it forwardly out of the way of the stop projections. The movement is continuous until the stop projection moves past the inclined edge of the stop dog 220 on which it is riding, whereupon this stop dog flies out under the influence of the tension spring 222. At practically the same instant, the edge of the stop projection engages the shoulder on the opposite dog so that the stop projection is now held between the opposing shoulders of the two stop dogs.

As the stop projection 236 slides along the inclined edge of the stop dog 220 it is forced slightly to the rear and when it passes the point 239 it snaps forwardly under the action of the spring 226. This forces the dog 220 which stops the movement of the projection 236 inwardly and causes the opposed edges of the dogs 220 between which the stop 236 is located to approach each other slightly and firmly engage and accurately position the stop projection 236.

I claim:

1. In a calculating machine, a driving shaft oscillatable back and forth, an oscillatable driven shaft which controls the movement of the accumulator actuators, a flexible transmission between said shafts whereby the driven shaft may lag behind and later catch up with the driving shaft, and means for preventing the return movement of the driving member before the completion of the advance movement of the driven member, said preventing means comprising a toggle mechanism, means movable independently of said driven member tending to break said toggle, and said means being controlled by said driven member whereby said toggle-breaking means are held against action until completion of the advance movement of the driven member and are thereafter released to break the toggle.

2. In a calculating machine, a driving rock arm oscillatable back and forth, a driven rock arm oscillatable back and forth which controls the movement of the accumulator actuators, flexible transmission between said rock arms, whereby the driven rock arm may lag behind and later catch up with the driving rock arm, and means to prevent the return movement of the driving rock arm before the completion of the advance movement of the driven rock arm, said preventing means comprising a toggle mechanism, means movable independently of said driven member tending to break said toggle, and said means being controlled by said driven member whereby said toggle-breaking means are held against action until completion of the advance movement of the driven member and are thereafter released to break the toggle.

3. In a calculating machine, a driving rock arm oscillatable back and forth, a driven rock arm oscillatable back and forth which controls the movement of the accumulator actuators, flexible transmission between said rock arms, whereby the driven rock arm may lag behind and later catch up with the driving rock arm, and means to prevent the return movement of the driving rock arm before the completion of the advance movement of the driven rock arm, said preventing means comprising a toggle mechanism, and a spring actuated member movable independently of said driven rock arm for breaking the toggle held against movement by the driven rock arm until the completion of its advance movement.

4. In a calculating machine, a series of spring driven actuators, an accumulator controlled by said actuators, and means for controlling the movement of said actuators and returning them, comprising a series of rock members, one for each actuator oscillatable back and forth with said actuators, a member common to all said rock members for returning such as have been moved by their respective springs, and a plurality of oscillatable friction members, coaxial with and frictionally engaging the rock members, respectively, and collectively movable with said common returning member.

5. In a calculating machine, a type bar, a hammer for actuating said type bar, a detent oscillatable about a fixed pivot for holding said hammer against movement, a movable trip member pivotally secured to said detent, means for swinging said trip member about its pivotal connection with said detent and a fulcrum member movable into the path of said trip member for causing it to spring about said fulcrum member to actuate the detent to release the hammer.

6. In a calculating machine, an actuator shiftable back and forth, an accumulator movable into and out of cooperative relation with respect to said actuator, and means for controlling the movement of said accumulator, comprising a slidable member, slidable in one direction before the beginning of the advance movement of the actuator and slidable in the reverse direction after the advance and before the return movement of the actuator, sub-total key mechanism for placing the accumulator in driven relation with respect to said slidable member on the advance movement of said member, and total key mechanism for placing the accumulator in driven relationship with respect to said slide member on both the advance and return movement of said member.

7. In a calculating machine, an actuator shiftable back and forth, an accumulator movable into and out of cooperative relation with respect to said actuator, and means for controlling the movement of said accumulator, comprising a slidable member, slidable in one direction before the beginning of the advance movement of the actuator and slidable in the reverse direction after the advance and before the return movement of the actuator, sub-total key mechanism for placing the accumulator in driven relation with respect to said slidable member on the advance movement of said member, and total key mechanism for placing the accumulator in driven relationship with respect to said slide member on both the advance and return movement of said member, and a second slidable member shiftable back and forth for moving the accumulator out of cooperative relationship with respect to the actuator after the return movement of the said actuator.

8. In a calculating machine, an actuator shiftable back and forth, an accumulator movable into and out of cooperative relation with respect to said actuator, and means for controlling the movement of said accumulator comprising a slidable member, slidable in one direction before the beginning of the advance movement of the actuator and slidable in the reverse direction after the advance and before the return movement of the actuator, sub-total key mechanism for placing the accumulator in driven relation with respect to said slidable member on the advance movement of said member, and total key mechanism for placing the accumulator in driven relationship with respect to said slide member on both the advance and return movement of said member, said slide having provisions for blocking movement of said keys after said slide has started on its advance movement.

In witness whereof, I have hereunto subscribed my name.

OLIVER D. JOHANTGEN.